(12) United States Patent
Klap et al.

(10) Patent No.: US 10,576,856 B2
(45) Date of Patent: Mar. 3, 2020

(54) PASSENGER SEAT INCLUDING A NET BACKREST

(71) Applicant: Safran Seats USA LLC, Gainesville, TX (US)

(72) Inventors: Paulien Klap, Amsterdam (NL); Odette Elise van Meurs, Delft (NL); Thomas Emanuel Frans Schalkwijk, Rotterdam (NL); Anne-marieke Küppers, The Hague (NL); Piet Hans de Vries, Delft (NL); Olmo Merijn Meijs, Delft (NL)

(73) Assignee: Safran Seats USA LLC, Gainesville, TX (US)

( * ) Notice: Subject to any disclaimer, the term of this patent is extended or adjusted under 35 U.S.C. 154(b) by 57 days.

(21) Appl. No.: 15/767,197

(22) PCT Filed: Mar. 21, 2016

(86) PCT No.: PCT/US2016/023425
§ 371 (c)(1),
(2) Date: Apr. 10, 2018

(87) PCT Pub. No.: WO2017/065824
PCT Pub. Date: Apr. 20, 2017

(65) Prior Publication Data
US 2019/0070989 A1 Mar. 7, 2019

Related U.S. Application Data

(60) Provisional application No. 62/241,390, filed on Oct. 14, 2015.

(51) Int. Cl.
*A47C 3/00* (2006.01)
*B60N 2/66* (2006.01)
(Continued)

(52) U.S. Cl.
CPC ......... *B60N 2/6671* (2015.04); *B60N 2/5858* (2013.01); *B60N 2/686* (2013.01);
(Continued)

(58) Field of Classification Search
CPC .... B60N 2/7076; B60N 2/5858; B64D 11/06; B64D 11/0649; B64D 11/0647;
(Continued)

(56) References Cited

U.S. PATENT DOCUMENTS 3,172,702 A * 3/1965 Rose ................... B60N 2/882
297/397
6,508,509 B2 * 1/2003 Peterson ................. A47C 7/24
297/218.4

(Continued)

FOREIGN PATENT DOCUMENTS

GB 2437164 10/2007

OTHER PUBLICATIONS

International Patent Application No. PCT/US2016/023425, International Search Report and Written Opinion, dated Jun. 30, 2016.

*Primary Examiner* — Chi Q Nguyen
(74) *Attorney, Agent, or Firm* — Kilpatrick Townsend & Stockton LLP; Dean W. Russell; Tyler T. McAllister (57) ABSTRACT

Passenger seat assemblies including net backrests are described. An example passenger seat assembly can include a lower frame (14) configured to support a seat bottom (36) of the passenger seat. The passenger seat assembly can also include a backrest frame (18) attached to the lower frame (14) and configured to support a backrest assembly. The backrest assembly can include a backplate (16) disposed adjacent an aft side of the backrest frame (18). The backrest assembly can also include a net material (22) attached to the backplate (16) at a first attachment location (46a) on an aft surface of the backplate (16), extending around a forward
(Continued)

side of the backrest frame (18), and attached to the backplate (16) at a second attachment location (46*b*) on the aft surface.

20 Claims, 6 Drawing Sheets (51) Int. Cl.
  *B60N 2/68* (2006.01)
  *B64D 11/06* (2006.01)
  *B60N 2/58* (2006.01)
  *B60N 2/70* (2006.01)

(52) U.S. Cl.
  CPC ............ *B60N 2/7011* (2013.01); *B64D 11/06* (2013.01); *B64D 11/0647* (2014.12); *B64D 11/0649* (2014.12)

(58) Field of Classification Search
  CPC ..... B61D 33/0035; Y02T 50/46; Y02T 50/40; Y02T 50/42; Y10T 29/48; Y10T 29/49826
  USPC ... 297/452.18, 440.1, 452.42, 440.11, 452.2, 297/452.56, 452.63, 452.64
  See application file for complete search history.

(56) References Cited

U.S. PATENT DOCUMENTS

| | | | | |
|---|---|---|---|---|
| 6,550,866 | B1 * | 4/2003 | Su | A47C 7/282 |
| | | | | 297/440.11 |
| 7,871,039 | B2 * | 1/2011 | Fullerton | B60N 2/7011 |
| | | | | 244/118.5 |
| 8,297,708 | B2 * | 10/2012 | Mizobata | B60N 2/7011 |
| | | | | 297/230.11 |
| 9,090,188 | B2 * | 7/2015 | Imamura | B60N 2/64 |
| 9,682,644 | B2 * | 6/2017 | Fujita | B60N 2/7011 |
| 2002/0195863 | A1 | 12/2002 | Su | |
| 2003/0034684 | A1 | 2/2003 | Wu | |
| 2005/0046259 | A1 * | 3/2005 | Schurg | B60N 2/0292 |
| | | | | 297/354.12 |
| 2008/0290715 | A1 | 11/2008 | Fullerton et al. | |
| 2011/0133531 | A1 * | 6/2011 | Yeh | B60N 2/06 |
| | | | | 297/232 |
| 2011/0298268 | A1 * | 12/2011 | Mizobata | B60N 2/682 |
| | | | | 297/452.18 |
| 2014/0117737 | A1 * | 5/2014 | Takahashi | B60N 2/72 |
| | | | | 297/452.18 |
| 2015/0239381 | A1 * | 8/2015 | Hamabe | B60N 2/7094 |
| | | | | 297/313 |
| 2018/0072187 | A1 * | 3/2018 | Katoh | B60N 2/028 |

* cited by examiner

PASSENGER SEAT INCLUDING A NET BACKREST

CROSS REFERENCE TO RELATED APPLICATIONS

This application is related to and claims priority benefits from U.S. Provisional Application Ser. No. 62/241,390 ("the '390 application"), filed on Oct. 14, 2015, entitled "Flex-net". The '390 application is hereby incorporated in its entirety by this reference.

FIELD OF THE INVENTION

The field of the invention relates to passenger seats.

BACKGROUND

Passenger seats for use in an aerospace environment often have components constructed from light-weight materials such as aluminum, plastics, and composites. For example, a passenger seat may include a backrest frame formed from one of these light-weight materials. The backrest frame of the passenger seat may support other parts of the passenger seat (e.g., a back plate, cushioning, entertainment system, brackets, etc.). These other parts may be attached to the backrest frame using fasteners such as screws, inserts, rivets, etc. Use of such fasteners may damage and/or weaken the backrest frame. To account for such anticipated damage and/or weakening, the backrest frame may be designed to have increased strength, which often comes with increased weight. This increased weight attributable to the backrest frame may be undesirable; especially in commercial airline applications, where many seats are included in each aircraft.

When seated in the passenger seat, good support of the lumbar area of a passenger's back is important for proper spine alignment and overall comfort. Proper spine alignment corresponds to the natural curve of one's spine. This natural curve can vary drastically from one passenger to the next. In an attempt to provide lumbar support for passengers with different spine characteristics (e.g., different natural curves), passenger seats have been developed that include blow-up pillows, movable cushions, and bending plates. Such lumbar support systems, however, may be undesirable in an aerospace environment because of their added weight and high space requirements. In addition, such solutions may lack the versatility to provide proper lumbar support to a majority of passengers.

Additionally, the natural curve of the passenger's spine changes as the passenger sits in different positions. For example, when the passenger is seated in the passenger seat in an upright position, the natural curve is more pronounced as compared to when the passenger is seated in the passenger seat in a reclined position. Adjusting a lumbar support system to account for the position of the passenger seat may be burdensome to the passenger (e.g., requiring operation of mechanical and/or electrical devices to deflate/inflate pillows, move cushions, or adjust bending plates) or altogether forgotten. This may lead to a reduction in the benefits associated with of lumbar support, and may lead to discomfort and/or injury from improperly configured lumbar support.

SUMMARY

Embodiments covered by this disclosure are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain examples, an assembly may be provided. The assembly may include a frame, a backplate, and a net material. The frame can include a forward side and an aft side. The backplate can be disposed adjacent to the aft side of the frame. The backplate can include an interior surface and an exterior surface. The interior surface can define a hollow interior of the backplate. The hollow interior can surround at least a portion the frame. The exterior can include a first attachment location and a second attachment location. The net material can extend between the first attachment location and the second attachment location. The net material can at least partially surround the frame and the backplate.

In some examples, the frame can be a U-shaped structure having a first leg, a second leg, and a top extending between the first leg and the second leg.

In some examples, the hollow interior of the backplate can include one or more lips extending around a perimeter of the backplate. The one or more lips can be dimensioned to receive the first leg, the second leg, and the top. The one or more lips can also be configured to surround a portion of the first leg, a portion of the second leg, and a portion of the top.

In some examples, the net material can include a first end having a first structure of a first attachment system, and a second end having a first structure of a second attachment system.

In some examples, the first attachment location can include a second structure of the first attachment system. The second attachment location can include a second structure of the second attachment system. Each of the first and second attachment systems can be configured to join respective first structures with respective second structures to tension the net material between the first attachment location and the second attachment location.

In some examples, the first attachment system and the second attachment system are zippers.

In some examples, the assembly can further include an adjustable lumbar support, at least a portion of which can be woven into the net material.

In some examples, the adjustable lumbar support system can include a set of cable sets extending between a first leg of the frame and a second leg of the frame. Each cable set can include a plurality of cables.

In some examples, for each cable set, a first end of the cable set can be attached to the first leg of the frame and a second end of the cable set can be attached to a tension mechanism.

According to certain examples, a passenger seat can include a lower frame and a backrest frame. The lower frame can be configured to at least support a seat bottom of the passenger seat. The backrest frame can be attached to the lower frame and configured to at least support a backrest assembly of the passenger seat. The backrest assembly can include a backplate and a net backrest. The backplate can be disposed adjacent to an aft side of the backrest frame. The backplate can include a forward surface and an aft surface. The net backrest can be attached to the backplate at a first attachment location on the aft surface. The net backrest can extend around a forward side of the backrest frame, and can be attached to the backplate at a second attachment location on the aft surface.

In some examples, the net backrest can include a flexible net material that is configured to flexibly extend around the forward side of the backrest frame to retain the backrest frame between the backplate and the net material.

In some examples, the net backrest can be attached to the backplate at the first attachment location via a first zipper, and the net backrest can be attached to the backplate at the second attachment location via a second zipper.

In some examples, the passenger seat can also include one or more armrest support structures. The backrest frame can be attached to the lower frame via the armrest support structures.

In some examples, the passenger seat can also include a lumbar support system. A first part of the lumbar support system can be disposed in the net backrest adjacent to the forward side of the frame. A second part of the lumbar support system can be disposed in an armrest support structure attached to the lower frame and the backrest frame.

In some examples, the first part can include a set of cable sets woven into the net backrest, and the second part can include a set of tension mechanisms connected to the set of cable sets. Each tension mechanism can be configured to independently adjust tension in each respective cable set.

In some examples, the lumbar support system further includes a set of connecting cables extending around a horizontal support member of the lower frame. The set of tension mechanisms can be connected to the set of cable sets via the set of connecting cables. Pivoting the backrest frame from an upright position to a reclined position can reduce tension in the set of cable sets disposed in the net backrest.

In some examples, the forward surface of the backplate can include an interior surface and one or more lip surfaces defining a hollow interior. The net backrest, when attached at the first attachment location and the second attachment location, can hold the interior surface in physical contact with the aft side of the backrest frame, with the one or more lip surfaces extending around a perimeter of the backrest frame.

According to certain examples, a method of assembling a passenger seat can be provided. The method can include providing a backrest frame comprising an aft side and a forward side. The method can also include bringing a hollow interior surface of a backplate into contact with a portion of the aft side of the backrest frame. The method can also include attaching a first end of a net material to an exterior surface of the backplate at a first attachment location. The method can also include attaching a second end of the net material to the exterior surface of the backplate at a second attachment location. In some examples, after attaching the first end and the second end to the backplate, the net material can contact the forward side of the backrest frame and can hold the hollow interior surface of the backplate in contact with the portion of the aft side of the backrest frame.

In some examples, the first end can include a first side of a zipper. The first attachment location can include a second side of the zipper. Attaching the first end of the net material to the exterior surface of the backplate at the first attachment location can include connecting the first side of the zipper and the second side of the zipper.

In some examples, the method can also include, subsequent to attaching the first end of the net material, stretching the net material around a first portion of the exterior surface of the backplate, around the front side of the backrest frame, and around a second portion of the exterior surface of the backplate.

DETAILED DESCRIPTION

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. The subject matter of embodiments of the present description is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide a net backrest for passenger seats that can include a lumbar support system. While the net backrests are discussed for use with aircraft seats, they are by no means so limited. Rather, embodiments of the net backrest may be used in passenger seats or other seats of any type or otherwise as desired.

Generally, a net backrest can be stretched around a frame of a passenger seat and attached to a backplate of the passenger seat. The backplate can include lips that are slightly larger than an outside dimension of the frame. For example, a lip can run continuously around three sides of the backplate (e.g., a top side, a right side, and a left side). The lip of the backplate can be sized to receive the frame within an interior of the backplate. Once the backplate receives the frame, the net backrest can be attached to a first location on the backplate using a first attachment system (e.g., a first zipper), wrapped around a front side of the frame, and attached to a second location on the backplate using a second attachment system (e.g., a second zipper). The net backrest may be formed from a flexible net material and may be dimensioned such that attachment at the second location on the backplate is achieved by stretching the flexible net material. Such stretching and attaching of the flexible net material can compress the frame between the backplate and the net backrest without fasteners and in a manner that provides a comfortable backrest for the passenger seat.

The passenger seat can include an adjustable lumbar support system disposed in a lower region of the net backrest. Unlike conventional lumbar support systems, the lumbar support system described herein can include a set of cable sets that can be woven or otherwise attached to the net backrest. Each cable set can include a plurality of cables disposed at different heights in the net backrest. Each cable set can be fixed on one end to the frame of the passenger seat. An opposing end of each cable set can be threaded through the frame and/or through an armrest to a tension mechanism. Thus, in some examples, a tension mechanism can be provided for each of the cable sets, which can independently control each cable set. The tension mechanisms can be configured to adjust the tension in the cable sets. Increasing tension can cause the lower region of the net backrest to bulge forward, which can provide increased lumbar support. Decreasing tension can cause the lower region of the net backrest to recede towards the backplate, which can provide decreased or no lumbar support.

The lumbar support system can also be configured to automatically minimize or eliminate the lumbar support provided by the sets of cable sets when the passenger seat is pivoted from an upright position to a reclined position. For example, the opposing end of each cable set can be threaded around a structure of a lower support frame of the passenger seat and attached to a pivotable portion of the frame at a fixed location. The passenger seat can be mounted to the lower support frame. The lower support frame can be used to attach the passenger seat to a cabin of an aircraft. The structure of the lower support frame can be a horizontal tube that is disposed below the backrest frame. When the passenger seat is in the upright position, a distance between the horizontal tube and the fixed location can have a first dimension. As the passenger seat pivots to the reclined position, the distance between the horizontal tube and the fixed location can have a second dimension that is less than the first dimension. This reduction in the distance automatically reduces the tension in each cable set by essentially introducing slack into the cable sets. Even if the tension mechanisms have been actuated to introduce maximum tension in the lumbar support system (e.g., creating a maximum bulge in the lower region of the bet backrest), reclining the backrest can automatically reduce the tension to a minimum tension (e.g., causing maximum recession of the cable sets).

Figure 1:
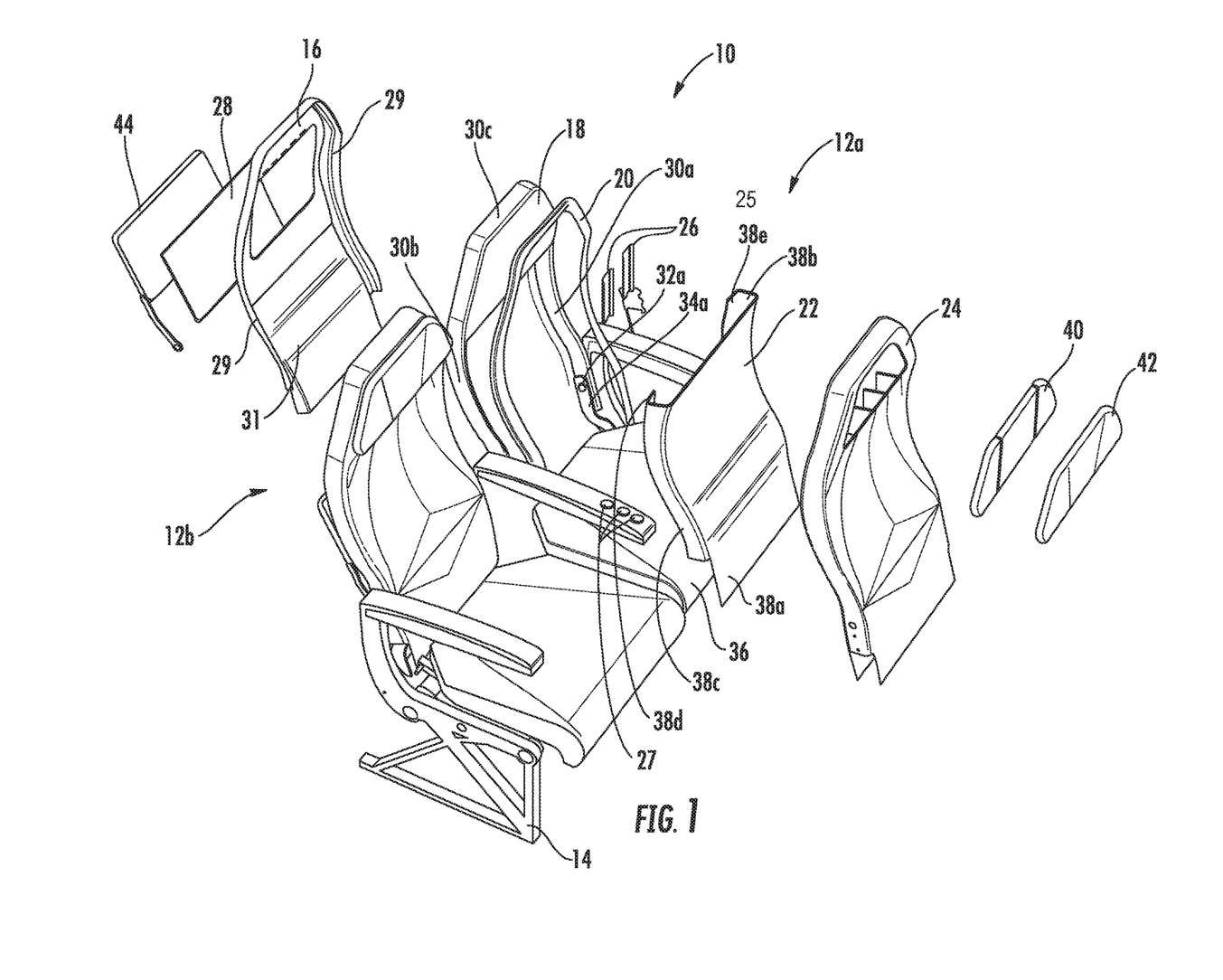
FIG. 1 is a perspective view of a seat row assembly including an exploded view of a passenger seat assembly of the seat row assembly, according to certain examples.

Turning now to the figures, FIG. 1 illustrates a seat row assembly 10 that includes a set of passenger seat assemblies 12a, 12b that can be provisioned as described herein, according to at least some examples. The seat row assembly 10 can include a lower support frame 14. In some examples, each of the passenger seat assemblies 12a, 12b include their own lower support frame 14. The lower support frame 14 can also be configured to support more than two seat assemblies in addition to supporting a single seat assembly.

FIG. 1 also illustrates an exploded view of the passenger seat assembly 12a. It is understood that the passenger seat assembly 12b can include components similar to those discussed with reference to the passenger seat assembly 12a. Thus, the discussion of the passenger seat assembly 12a will be refer to the passenger seat assembly 12.

The passenger seat assembly 12 can include a backplate 16, a backrest frame 18, a trim frame 20, a net backrest 22, a backrest cushion 24, cable routing structure(s) 26, and tension mechanisms 27. In some examples, a backrest assembly can include the backplate 16, the backrest frame 18, the trim frame 20, the net backrest 22, and/or the backrest cushion 24.

The backplate 16 can be formed of materials including but not limited to polycarbonate, polypropylene, composite materials, or other similar materials. The backplate 16 can formed from a sturdy material capable of having components attached thereto. For example, an accessory compartment 28 can be attached to the backplate 16, which can be used to retain emergency materials, magazines, literature, passenger items, and the like. The backplate 16 can include a lip 29 that extends about perpendicular away from a main body 31 of the backplate 16. In some examples, more than one lip 29 is provided on the backplate 16. The lip 29 can have a similar shape as the backrest frame 18, but be sized slightly larger than the backrest frame 18. In this manner, the lip 29 of the backplate 16 can be configured to index over an outward-facing surface of the backrest frame 18 when the backplate 16 is installed. The lip 29 and the main body 31 can define a hollow interior of the backplate 16 corresponding to a forward surface (e.g., the surface that is visible in FIG. 1 and faces towards a front of the seat). The backplate 16 can also have an aft surface (e.g., the surface that is not visible in FIG. 1 and is opposite the forward surface). In some examples, the backplate 16 can include any suitable number of openings to provide access to components behind the backplate 16 (e.g., the backrest frame 18). In some examples, an entertainment system can be installed in one of the openings of the backplate 16. The backplate 16 can be pre-tensioned such that when it is tensioned (after installation), it becomes stronger and more rigid.

The backrest frame 18 can be formed of materials including but not limited to aluminum, stainless steel, aramid fibers, polycarbonate, polypropylene, other metallic materials, composite materials, or other similar materials. For example, the backrest frame 18 can be formed from composite carbon fiber. The backrest frame 18 can include two legs 30a, 30b and a top 30c extending between the legs 30a, 30b. In this manner, the backrest frame 18 can have a turned-down U shape. The backrest frame 18 can be formed from rectangular shaped tubing. Lower ends of the legs 30a, 30b can be attached to the lower support frame 14 via pivots 32a, 32b (not shown) extending through backrest brackets 34a, 34b (not shown). The backrest frame 18 may be configured to pivot about the pivots 32 of the backrest brackets 34. The backrest brackets 34 may also be attached to a seat bottom 36 of the passenger seat assembly 12. In this manner, as the backrest frame 18 rotates about the pivots 32, the seat bottom 36 may translate forward and backward in connection with the backrest frame 18.

The trim frame 20 can be formed of materials including but not limited to aluminum, stainless steel, aramid fibers, polycarbonate, polypropylene, other metallic materials, composite materials, or other similar materials. The trim frame 20 can have a similar shape as the backrest frame 18. In some examples, the trim frame 20 is configured to retain the net backrest 22 to the backrest frame 18. For example, the net backrest 22 can have opposing edges that each include a bulbous shape. For example, the bulbous shape can include a bunching of the material that makes up the net backrest 22 or a piece of rigid material attached to the ends of the net backrest 22. The bulbous shape can correspond to sandwich grooves in the backrest frame 18 (now shown) and sandwich grooves (not shown) in the trim frame 20. The backrest frame 18 and the trim frame 20 can also include coupling grooves (not shown) configured to couple the backrest frame 18 and the trim frame 20. When the net backrest 22 is installed, the bulbous shaped ends can be sandwiched between the sandwich grooves and the trim frame 20 and held by the couple grooves coupling together.

The net backrest 22 can be formed of materials including but not limited to woven polyester fabrics, woven textiles, formed polypropylene fabrics, formed rubber, or other similar materials. In some examples, the net backrest 22 can be formed of one or more types of Dymetrol® as manufactured by Acme Mills of Bloomfield Hills, Mich. (e.g., a cotton and an elastomeric mono-filament). The material selected for the net backrest 22 can be flexible, stretchy, elastomeric, and/or have any other property relating to ability to bend easily. For example, the net backrest 22 can be configured to stretch around the backrest frame 18. In some examples, the net backrest 22 can also stretch around the backplate 16. For example, the net backrest 22 can be pre-tensioned in one or more directions by dimensioning the net backrest 22 to be about 5% smaller than its final mounting locations. In this manner, the net backrest 22 will be stretched to be installed in its final mounting locations (e.g., as discussed with reference to FIGS. 2A-2D). In some examples, the net backrest 22 can still be installed by hand even with the 5% stretch. In some examples, the net backrest 22 can function to retain the backrest frame 18 and the backplate 16 in their proper positions.

The net backrest 22 can be defined as having parts 38a-38e. For example, the part 38a can be a front part of the net backrest 22, the parts 38b, 38c can correspond to side parts of the net backrest 22, and the parts 38d, 38e can correspond to back parts of the net backrest 22. In some examples, the parts 38a-38e may be manufactured separately and assembled together to create the net backrest 22. For example, the parts 38a-38e can be sewn, glued, or otherwise assembled together to form the net backrest 22. The parts 38a-38e may be formed from materials having different properties. For example, the part 38a can be more flexible than the back parts 38d, 38e. In some examples, the net backrest 22 can be cut from a single piece of material.

The backrest cushion 24 can be formed of materials including but not limited to latex foam, polyurethane foam, or other similar materials. The backrest cushion 24 can be configured to attach to the backrest frame 18 in any suitable manner. The backrest cushion 24 can rely on the net backrest 22 for structural support when a passenger is seated in the passenger seat assembly 12.

The cable routing structure(s) 26 can be configured to route cabling included in a lumbar support system (e.g., cable sets 64 and/or connecting cables 66) from a lower portion of the net backrest 22 via an armrest 25 to connect with one or more tension mechanisms (not shown) included in the armrest 25 adjacent to the cable routing structures 26. The one or more tension mechanisms (e.g., the tension mechanisms 27 illustrated in FIG. 1 and associated with the passenger seat assembly 12b) can function to adjust the tension in the lumbar support system. The passenger seat assembly 12 can also include other components such as a head cushion 40, an adjustable head rest 42, and a tray table 44. These components can be attached to the backplate 16 and/or the backrest frame 18 as appropriate.

FIGS. 2A-2D illustrate a top view of the passenger seat assembly 12 depicting a process of attaching the backrest frame 18 between the backplate 16 and the net backrest 22. The backplate 16 can include first attachment structures 46a, 46b. The corresponding locations of the first attachment structures 46a, 46b may be considered attachment locations on the backplate 16. The first attachment structures 46a, 46b may extend down most, if not all, of the vertical height of the backplate 16. This may help to spread the tension applied by the first attachment structures 46a, 46b equally through the net backrest 22 and the backplate 16. The net backrest 22 can include corresponding second attachment structures 48a, 48b. The second attachment structures 48a, 48b can be disposed on the ends of the net backrest 22 adjacent the parts 38d and 38e. In some examples, the first attachment structures 46 and the second attachment structures 48 may be configured to couple with each other. For example, the attachment structures 46, 48 may detachably couple with each other in a manner that allows for installation and removal of the net backrest 22 from the backplate 16 without damaging the backplate 16 or the net backrest 22.

The attachment structures 46, 48 may together form an attachment system including, but not limited to buttons, snaps, zippers, hooks, staples, magnets, clips, screws, or any other suitable attachment system. For example, the first attachment structures 46 can be first sides of zippers which can be securely attached to the backplate 16. These first sides can be sewn, glued, stapled, or otherwise attached to the backplate 16. The second attachment structures 48 can be second sides of the zippers which can be securely attached to the ends of the net backrest 22. These second sides can likewise be sewn, glued, stapled, or otherwise attached to the ends of the net backrest 22.

Figure 2A:
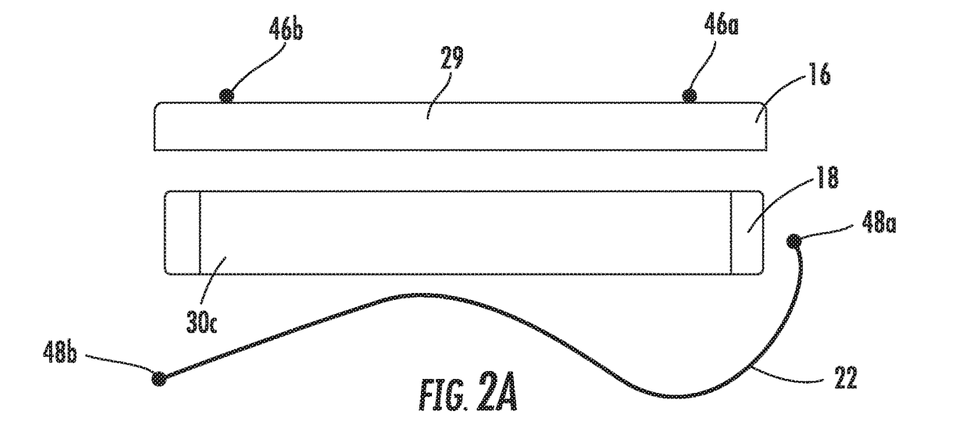
FIG. 2A is a top view of the passenger seat assembly of FIG. 1 illustrating a part of a process of attaching a backrest frame between a backplate and a net backrest.
Figure 2B:
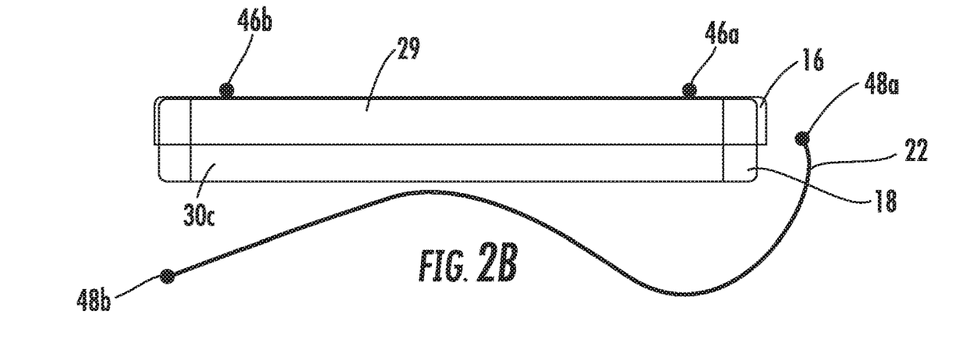
FIG. 2B is a top view of the passenger seat assembly of FIG. 1 illustrating a part of a process of attaching a backrest frame between a backplate and a net backrest.

FIG. 2A illustrates a first view of an assembly process including the backplate 16, the backrest frame 18, and the net backrest 22 prior to assembly. FIG. 2B illustrates an intermediate view of the assembly process in which the backplate 16 has been brought into contact with the backrest frame 18. In particular, the body 31 of the backplate 16 has been brought into contact with an aft side of the backrest frame 18. The lip 29 is shown to surround an exterior perimeter of the backrest frame 18. For example, the lip 29 extends around a portion of the top 30c of the backrest frame 18.

Figure 2C:
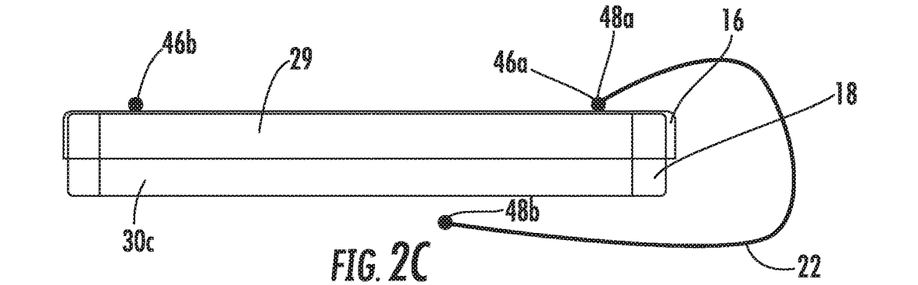
FIG. 2C is a top view of the passenger seat assembly of FIG. 1 illustrating a part of a process of attaching a backrest frame between a backplate and a net backrest.

FIG. 2C illustrates another intermediate view of the assembly process in which the first attachment structure 46a (e.g., a first side of a first zipper) is attached to the second attachment structure 48a (e.g., a second side of the first zipper). Attaching at this point may include aligning the two attachment structures 46a, 48a and using a zipper pull to engage the two attachment structures 46a, 48a (e.g., "zipping up" the first zipper). Thus, at this point, the other end of the net backrest 22 including the second attachment structure 48b can be stretched towards the first attachment structure 46b. Because the net backrest 22 is flexible, the net backrest 22 may flex around the exterior edges of the backrest frame 18 and the backplate 16.

Figure 2D:
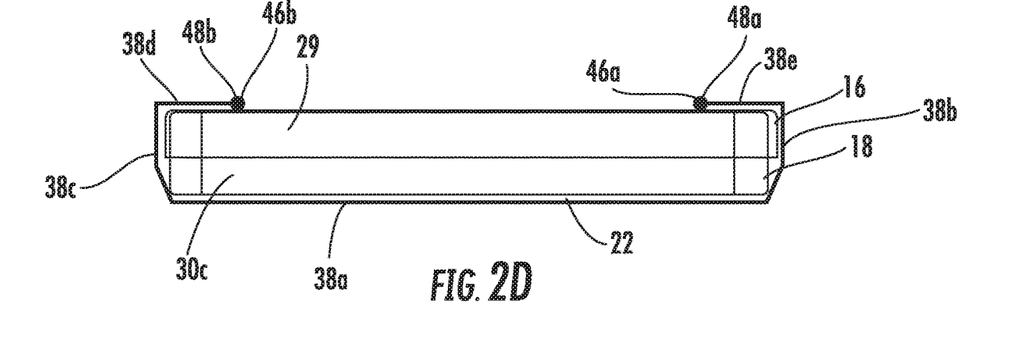
FIG. 2D is a top view of the passenger seat assembly of FIG. 1 illustrating a part of a process of attaching a backrest frame between a backplate and a net backrest.

FIG. 2D illustrates a final view of the assembly process in which the first attachment structure 46b (e.g., a first side of a second zipper) is attached to the second attachment structure 48b (e.g., a second side of the second zipper). Attaching at this point may include aligning the two attachment structures 46b, 48b and using a zipper pull to engage the two attachment structures 46b, 48b (e.g., "zipping up" the second zipper). Thus, at this point, the net backrest 22 has been stretched entirely around the backrest frame 18 (excluding the top part 30c in some examples) and around a portion of the backplate 16. This stretching and attaching as illustrated in FIG. 2D can function to securely hold the backplate 16 to the backrest frame 18 without requiring fasteners being applied to the backrest frame 18. Because of this, the backrest frame 18 can be less failure prone and can be manufactured using lighter weight materials. FIG. 2D illustrates the locations of the parts 38*a*-38*e* of the net backrest 22 with respect to the backplate 16 and the backrest frame 18. While illustrated as having sharp angles, it should be understood that the net backrest 22 can smoothly transition around the edges of the backplate 16 and the edges of the backrest frame 18. In some examples, any suitable zipper having sufficient strength to withstand opposing forces in the net backrest 22 introduced by the stretch may be used.

Figure 3:
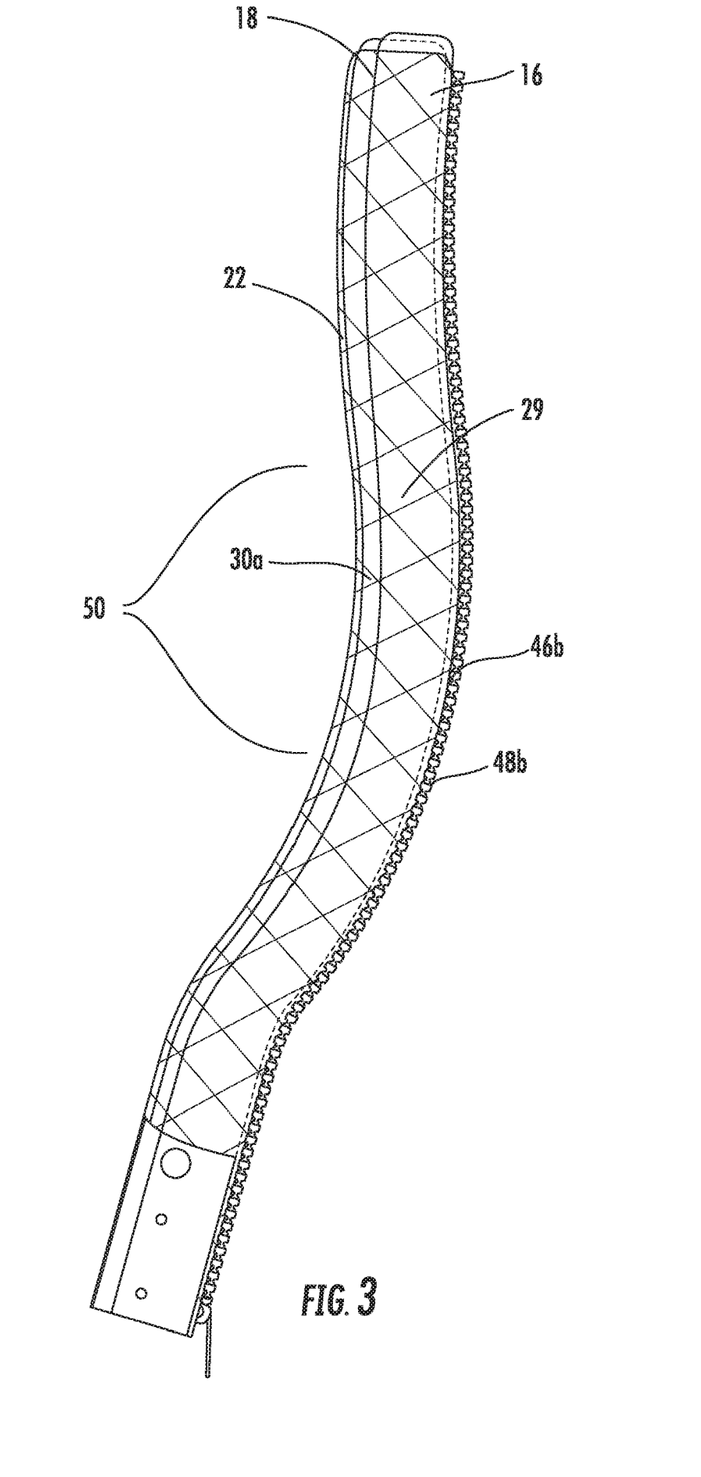
FIG. 3 is a side view of a part of the passenger seat assembly of FIG. 1.

FIG. 3 illustrates a side view of a portion of the passenger seat assembly 12*a* depicting a seat curve 50. The seat curve 50 faces a forward part of the passenger seat assembly 12*a* and can be designed to account for spine geometry. FIG. 3 also illustrates the lip 29 of the backplate 16 extending over the leg 30*a* of the backrest frame 18. The net backrest 22 is also illustrated as extending around the leg 30*a* of the backrest frame 18 and the lip 29 of the backplate 16 until it attaches to the backplate 16 by the attachment structures 46*b*, 48*b* (e.g., two opposing sides of a zipper). In some examples, the backplate 16 may extend almost the entire height of the backrest frame 18. Similarly, the net backrest 22 can extend almost the entire height of the backrest frame 18 and, in some examples, the entire height of the backplate 16.

Figure 4:
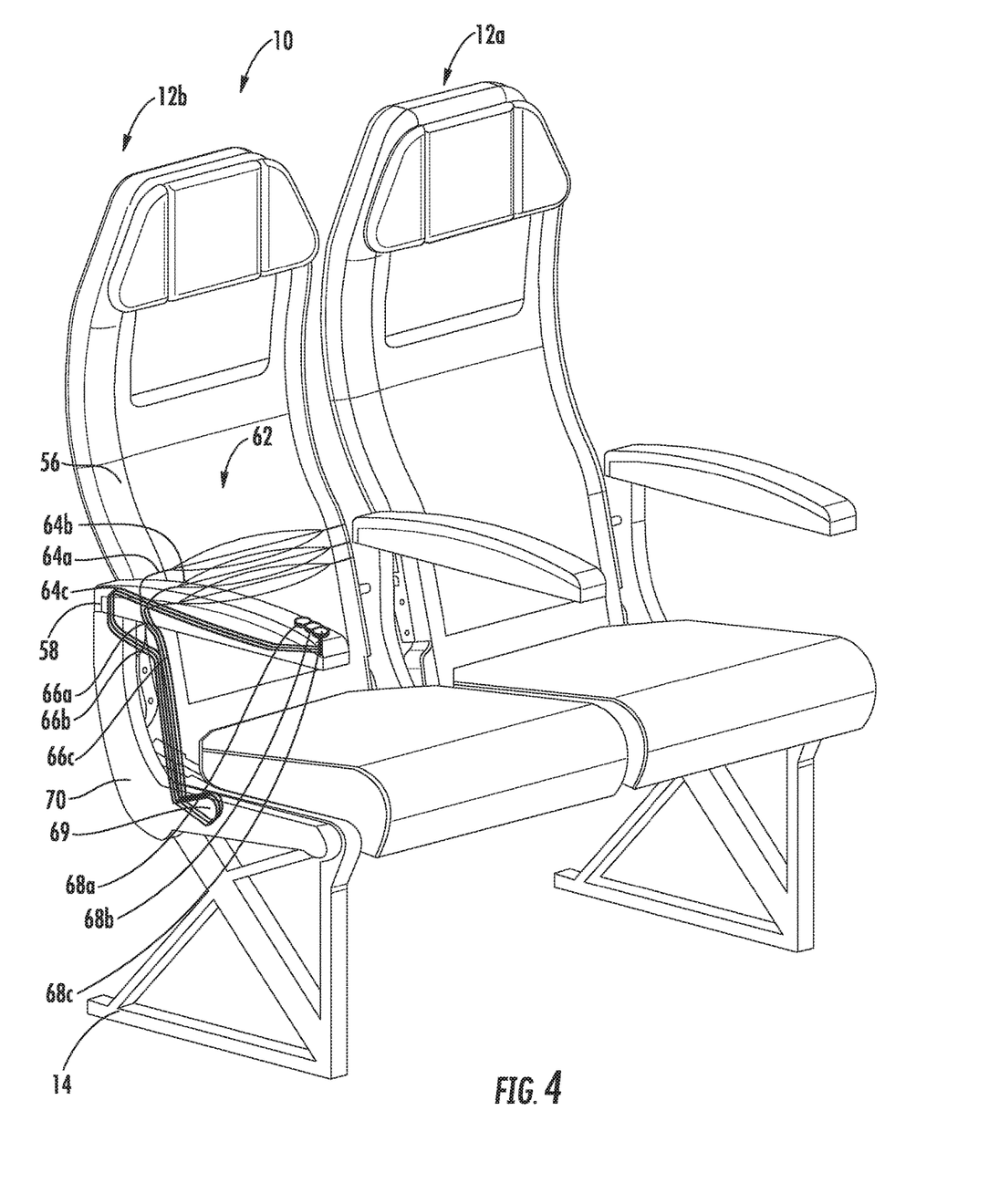
FIG. 4 is a perspective view of the seat row assembly of FIG. 1 illustrating a lumbar support system, according to certain examples.

FIG. 4 illustrates the seat row assembly 10 that includes the set of passenger seat assemblies 12*a*, 12*b*. The passenger seat assembly 12 can include a passenger seat 56 and an armrest 58 supported by the frame 14. The passenger seat 56 can include the backplate 16, the backrest frame 18, the net backrest 22, the backrest cushion 24, and the like, as described with reference to FIG. 1.

Figure 5:
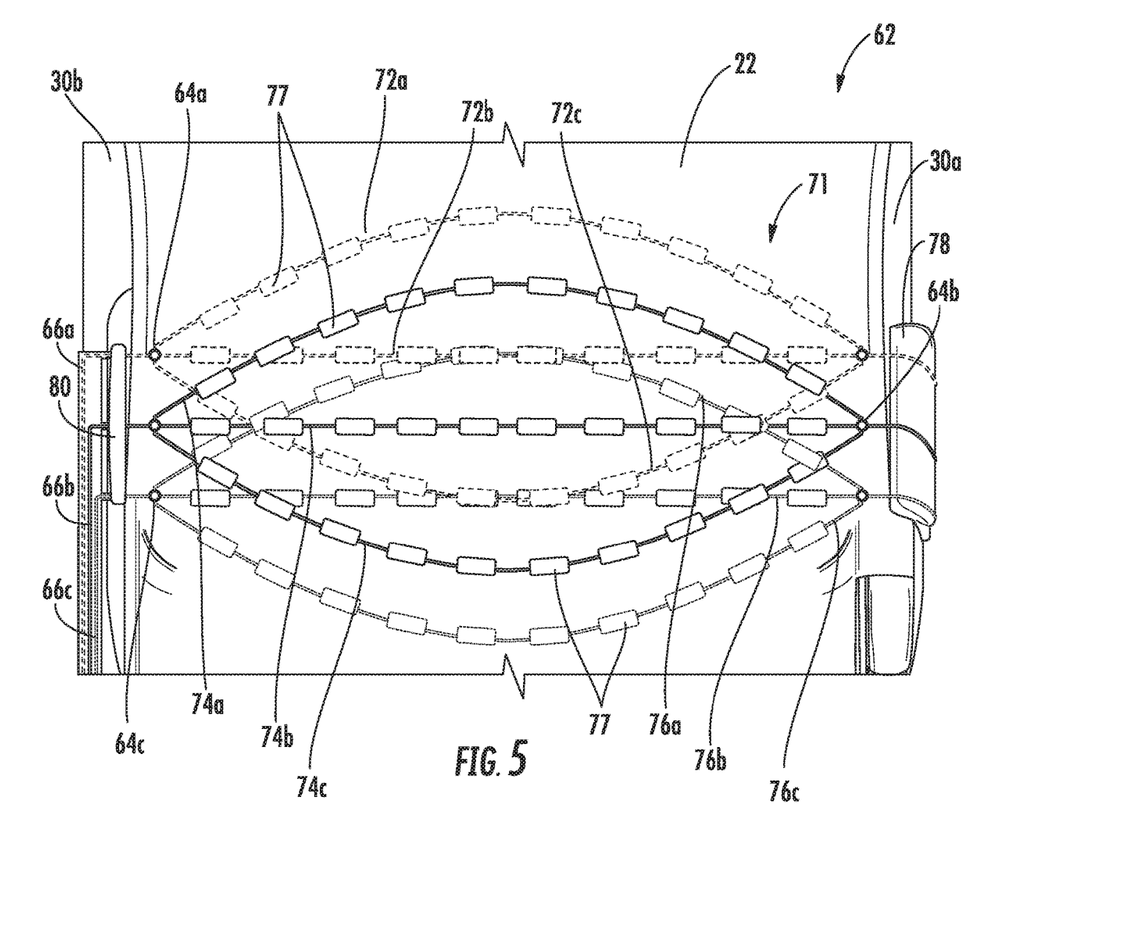
FIG. 5 is a front view of a passenger seat of the seat row assembly of FIG. 4 illustrating the lumbar support system.

The passenger seat 56 can also include a lumbar support system 62 disposed in a lower region of the passenger seat 56, adjacent the frame 14, and in the armrest 58. The lumbar support system 62 can be adjustable and can include cable sets 64*a*-64*c*, connecting cables 66*a*-66*c*, and tension mechanisms 68*a*-68*c*. In some examples, greater or few numbers of cable sets 64, connecting cables 66, and/or tensions mechanisms 68 may be provided. In some examples, the cable sets 64*a*-64*c* can extend between the backrest frame 18 that supports the passenger seat 56 and can be disposed in the net backrest 22 of the passenger seat 56. For example, as illustrated in FIG. 5, the cable sets 64 can be woven in the net backrest 22.

The connecting cables 66 can extend from ends of the cable sets 64 and be routed down an edge of the passenger seat 56, around the frame 14 at location 69, back up the edge of the passenger seat 56, into the armrest 58, and terminate at the tension mechanisms 68. The location 69 can correspond to a support member of the frame 14. In some examples, the connecting cables 66 may be routed through different components. For example, the connecting cables may be routed down through a seat bracket 70 instead of, or in addition to, the edge of the passenger seat 56. As described with reference to FIGS. 6A and 6B, the connecting cables 66 can include inner cables (e.g., 88 and 90) and outer cables (e.g., 82). In some examples, the seat bracket 70 may be considered an armrest support structure as it may be configured to support the armrest 58. In some examples, the backrest frame 18 is connected to the lower support frame 14 via the seat bracket 70.

The tension mechanisms 68 are examples of the tension mechanisms 27 described herein. The tension mechanisms 68 can be disposed in the armrest 58. The tension mechanisms 68 can also be located at other locations on the passenger seat assembly 12. For example, the tension mechanisms 68 can be disposed in the seat bracket 70. In some examples, each cable set 64 and each connecting cable 66 corresponds to one tension mechanism 68. In this manner, the tension in each cable set 64 can be adjusted independently. In some examples, a single tension mechanism 68 may be provided that is capable of adjusting tension in all of the cable sets 64. Generally, the tension mechanisms 68 are configured to adjust the tension in the lumbar support system 62 and retain a selectable tension. This can include mechanisms such as slide adjusters, twist adjusters, lever adjusters, pulley adjusters, push-button adjusters, swing adjusters, turn-buckle adjusters, electronic adjusters, a combination of the foregoing, or any other suitable adjuster.

For example, a twist adjuster with a set of gears can be configured to wrap cabling around one or more reels as a button of the twist adjuster is twisted. Releasing tension on the twist adjuster may be achieved by pulling the button outwards. Applying tension may be achieved by pushing downwards on the twist adjuster and rotating the twist adjuster. Examples of such tensions mechanisms can be similar to BOA Closure Systems manufactured by Boa Technology of Denver, Colo.

In some examples, increasing tension in the lumbar support system 62 by the tension mechanisms 68 can cause the lower region of the net backrest 22 to bulge forward, which can provide increased lumbar support. Decreasing tension in the lumbar support system 62 by the tension mechanisms 68 can cause the lower region of the net backrest 22 to recede towards the backplate 16, which can provide decreased or no lumbar support.

In some examples, any of the adjusters may be electrically controlled. For example, a small electric motor may be configured to rotate a set of turnbuckles connected to the connecting cables 66 to increase and decrease tension in the lumbar support system 62.

As illustrated in FIG. 5, each cable set 64 can each include one or more lumbar supporting cables connected at cable manifolds to create a lumbar net 71. The cable manifolds may be any suitable structures configured to hold multiple cables. For example, the cable set 64*a* can include three lumbar supporting cables 72*a*-72*c*, the cable set 64*b* can include three lumbar supporting cables 74*a*-74*c*, and the cable set 64*c* can include three lumbar supporting cables 76*a*-76*c*. In some examples, greater or few numbers of lumbar supporting cables per each cable set 64 may be used. This may adjust the shape of the lumbar net 71. For example, a single lumbar supporting cable may be used, two lumbar supporting cables may be used, three (as illustrated) lumbar supporting cables may be used, four or five lumbar supporting cables may be used. In some examples, the cable sets 64 can extend into different regions in the lumbar area of the net backrest 22. In some examples, each of the cable sets 64 may be spaced apart by 2-6 centimeters. For example, the cable sets 64 can be spaced at about 3 centimeters apart from each other at the locations where the cable sets 64 attach to the legs 30*a*, 30*b* of the backrest frame 18. A dimension between the top lumbar supporting cable 72*a* and the bottom lumbar supporting cable 72*c* can be between 8-20 centimeters. For example, the dimension between the top lumbar supporting cable 72*a* and the bottom lumbar supporting cable 72*c* can be about 10 centimeters. Similar spacing can be provided for other cable sets 64.

In some examples, the use of more than one cable set 64 including more than one lumbar supporting cables 72, 74, and 76 may be desirable to provide lumbar support to a wide group of passengers having various heights. The ability to do so may also be increased by the ability of the tension mechanisms 68 to independently control the tension in each of the cable sets 64. For example, a tall passenger may need to add increased tension in the cable set 64*a* and reduce the tension in the other two cable sets 64*b*, 64*c*. A passenger of average height may need to apply the most tension to the cable set 64*b*, with equally less tension on the cable sets 64*a*, 64*c*. A passenger that is shorter than average may need to apply the most tension to the cable set 64*c*, with progressively less tension in the cable sets 64*b* and 64*a*.

The lumbar supporting cables can be formed of any suitable material such as, but not limited to, steel wire, iron yarn, cotton yarn, plastic wire, composite fibers, and the like. For example, the lumbar supporting cables can be 7×7 steel cables with a diameter between 0.5 and 1 millimeter. For example, the diameter can be about 0.63 millimeter.

The lumbar supporting cables 72-76 can be woven through openings 77 in the net backrest 22. In some examples, the number of the times that the lumbar supporting cables 72-76 are woven through openings 77 in the net backrest 22 may impact the shape of the lumbar net 71 and the function of the lumbar support system 62. The openings 77 may be holes in the net material that are present by virtue of the net material being a net. In some examples, the openings 77 may be formed or otherwise placed in the net backrest 22 during manufacture of the net backrest 22. The lumbar supporting cables 72-76 can also be held in location in the net backrest 22 using any other suitable technique. For example, pathways formed from fabric, net material, or some other flexible material, may be attached to the net backrest 22 (e.g., sewn, glued, or otherwise) in the shape of the lumbar net 71. The lumbar supporting cables 72-76 can then be threaded through the pathways and held in place by the virtue of being within the pathways. As an additional example, a plurality of tabs may be attached to the net backrest 22 (e.g., sewn, glued, or otherwise) in the shape of the lumbar net 71. The lumbar supporting cables 72-76 can then be threaded through the tabs and held in place by the tabs. In some examples, the tabs may hold the lumbar supporting cables 72-76 similar as the openings 71.

In some examples, greater or few numbers of lumbar supporting cables per each cable set 64 may be used. This may adjust the shape of the lumbar net 71. For example, a single lumbar supporting cable may be used, two lumbar supporting cables may be used, three (as illustrated) lumbar supporting cables may be used, four or five lumbar supporting cables may be used.

As illustrated in FIG. 5, first ends of the cable sets 64 can be attached to the leg 30*a* of the backrest frame 18 at the mounting block 78. The mounting block 78 can be attached to the leg 30*a*. The mounting block 78 can have one or more grooves (e.g., three grooves corresponding to the three cable sets 64). The grooves can function to hold the cables of the cable sets 64 and space them appropriately. Opposite ends of the cable sets 64 can be routed grooves in a routing block 80. The routing block 80 can be attached to the leg 30*b*. At or around the routing block 80, the opposite ends of the cable sets 64 can be attached to the connecting cables 66. The mounting block 78 and the routing block 80 can be formed from any suitable material including, for example, aluminum, stainless steel, aramid fibers, polycarbonate, polypropylene, other metallic materials, composite materials, or other similar materials. The connecting cables 66 can be any suitable steel cable such as a 7×7 wound steel cable including a Teflon coating. The connecting cables 66 can have a diameter of about between 0.5 and 1.0 millimeters. For example, the diameter can be about 0.81 millimeters. In some examples, the lengths of the connecting cables 66 can be between 1 and 2 meters. For example, the lengths can be about 1.5 meters.

Figure 6A:
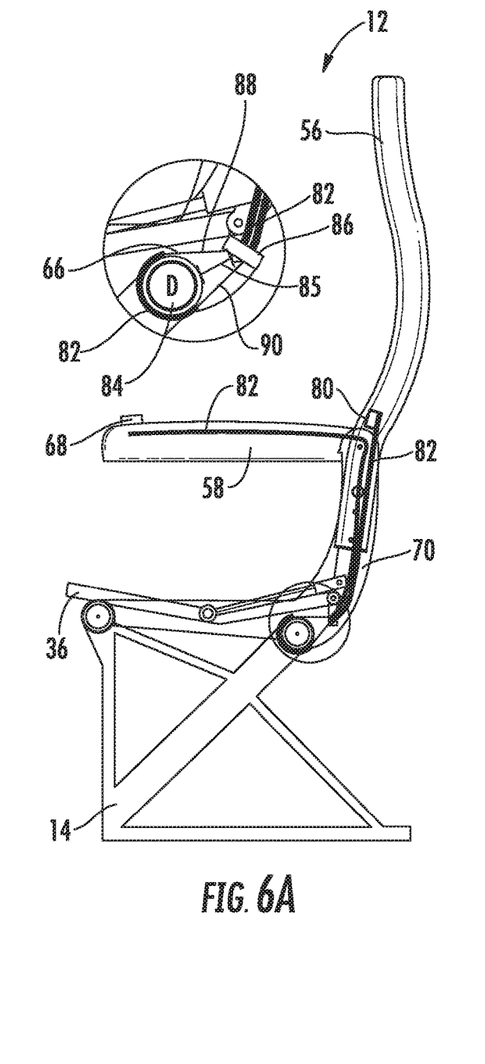
FIG. 6A is a side view of the passenger seat of FIG. 5 in an upright position.
Figure 6B:
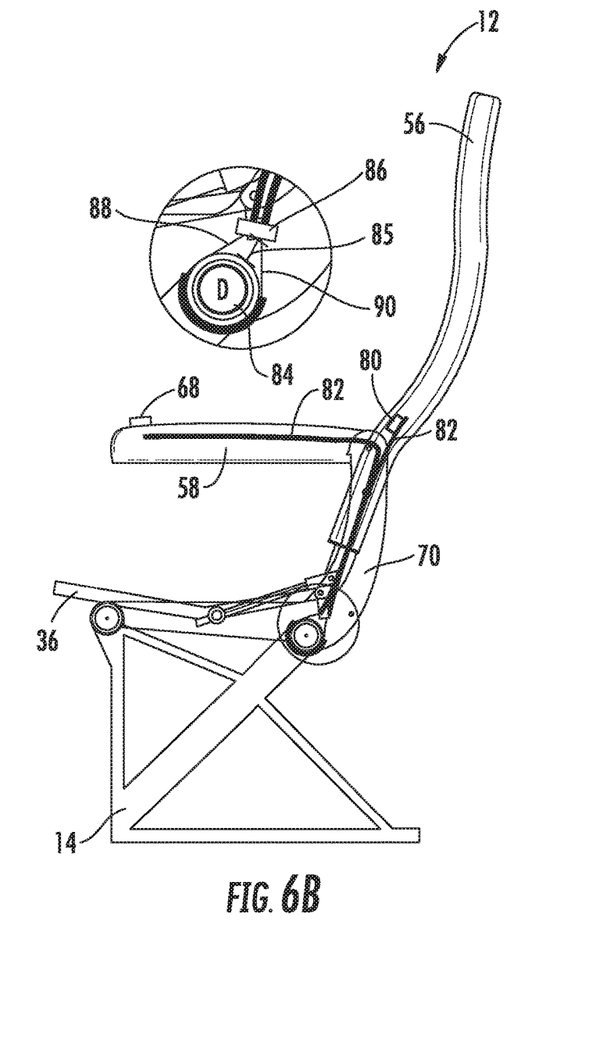
FIG. 6B is a side view of the passenger seat of FIG. 5 in an reclined position.

As illustrated in FIGS. 6A and 6B, in some examples, the connecting cables 66 can be routed through individual outer hollow cables 82. The outer hollow cables can have inner diameters between 1 to 2 millimeters. For example, the inner diameters can be about 1.5 millimeter. The outer hollow cables can have outer diameters between 2 to 3 millimeters. For example, the outer diameters can be about 2.5 millimeter. In some examples, the connecting cables 66 enter the outer hollow cables 82 after leaving the routing block 80. The outer hollow cables 82 may be used in locations where the connecting cables 66 are being routed through and around components of the passenger seat assembly 12. In some examples, the outer hollow cables 82 are fixed in their positions, with the connecting cables 66 moving inside the outer hollow cables 82.

FIGS. 6A and 6B illustrate an example routing of the connecting cables 66 between the lumbar net 71 and the tension mechanisms 68. The connecting cables 66 can begin at or around the routing block 80. At the routing block 80, the cable sets 64 transition from the lumbar net 71 spanning horizontally across the net backrest 22 to the connecting cables 66. The connecting cables 66 then extend down the edge of the passenger seat 56, the backrest frame 18, and/or the seat bracket 70. Next, the connecting cables 66 extend from a bottom side of a support member 84 of the frame 14 and around to a top side of the support member 84. In some examples, the support member 84 is a horizontal support tube of the frame 14 that is configured to support a rear portion of the passenger seat 56. From the top side of the support member 84, the connecting cables 66 extend up the edge of the passenger seat 56, the backrest frame 18, and/or the seat bracket 70 until they enter the armrest 58 and terminate at the tension mechanisms 68.

FIG. 6A illustrates a side view of the passenger seat assembly 12 in an upright position. While in the upright position, the lumbar support system 62 can function as described herein. In particular, use of the one or more tension mechanisms 68 will function to adjust the tension in the lumbar net 71 (illustrated in FIGS. 4 and 5). This may be because a distance 85 between the support member 84 and a cable bracket 86 has a first, maximum dimension. The cable bracket 86 can function to retain the outer hollow cables 82 at a fixed location. In the upright position, the distance 85 has the first, maximum dimension, which results in cable segments 88 and 90 being tensioned. As illustrated in FIG. 6B, however, as the passenger seat 56 is rotated to a reclined position, the distance 85 is reduced to have a second, minimum dimension. Reduction in the distance introduces slack in the connecting cables 66 (e.g., as evidenced by the cable segments 88 and 90 being shorter than in FIG. 6A), which results in the tension being taken out of the lumbar support system 62. This reduction in tension takes place automatically in response to the passenger seat 56 moving to the reclined position. In this manner, the lumbar net 71 automatically recedes back towards a backside of the passenger seat assembly 12. When the tension is taken out of the lumbar support system 62, the lumbar net 71 may be incapable of providing lumbar support. This may result in increased passenger comfort as the spine geometry changes between when a passenger is sitting upright compared to when the passenger is reclined.

In the following, further examples are described to facilitate the understanding of the disclosure:

1. A seat frame assembly, comprising:
a frame having a forward side and an aft side;
a backplate disposed adjacent to the aft side of the frame, the backplate comprising:
an interior surface that defines a hollow interior of the backplate, the hollow interior surrounding at least a portion the frame; and
an exterior surface comprising a first attachment location and a second attachment location; and
a net material extending between the first attachment location and the second attachment location, the net material at least partially surrounding the frame and the backplate.

2. The seat frame assembly of any of the preceding or subsequent examples, wherein the frame is a U-shaped structure comprising:
a first leg;
a second leg;
and a top extending between the first leg and the second leg.

3. The seat frame assembly of any of the preceding or subsequent examples, wherein the hollow interior of the backplate comprises one or more lips extending around a perimeter of the backplate, the one or more lips:
dimensioned to receive the first leg, the second leg, and the top; and
configured to surround a portion of the first leg, a portion of the second leg, and a portion of the top.

4. The seat frame assembly of any of the preceding or subsequent examples, wherein the net material comprises:
a first end comprising a first structure of a first attachment system; and
a second end comprising a first structure of a second attachment system.

5. The seat frame assembly of any of the preceding or subsequent examples, wherein the first attachment location comprises a second structure of the first attachment system, and the second attachment location comprises a second structure of the second attachment system, each of the first and second attachment systems configured to join respective first structures with respective second structures to tension the net material between the first attachment location and the second attachment location.

6. The seat frame assembly of any of the preceding or subsequent examples, wherein the first attachment system and the second attachment system are zippers.

7. The seat frame assembly of any of the preceding or subsequent examples, further comprising an adjustable lumbar support, at least a portion of which being woven into the net material.

8. The seat frame assembly of any of the preceding or subsequent examples, wherein the adjustable lumbar support system comprises a set of cable sets extending between a first leg of the frame and a second leg of the frame, each cable set comprising a plurality of cables.

9. The seat frame assembly of claim any of the preceding or subsequent examples, wherein, for each cable set, a first end of the cable set is attached to the first leg of the frame and a second end of the cable set is attached to a tension mechanism.

10. A passenger seat assembly, comprising:
a lower frame configured to at least support a seat bottom of the passenger seat; and
a backrest frame attached to the lower frame and configured to at least support a backrest assembly of the passenger seat, the backrest assembly comprising:
a backplate disposed adjacent to an aft side of the backrest frame, the backplate comprising a forward surface and an aft surface; and
a net backrest attached to the backplate at a first attachment location on the aft surface, extending around a forward side of the backrest frame, and attached to the backplate at a second attachment location on the aft surface.

11. The passenger seat assembly of any of the preceding or subsequent examples, wherein the net backrest comprises a flexible net material that is configured to flexibly extend around the forward side of the backrest frame to retain the backrest frame between the backplate and the net material.

12. The passenger seat assembly of any of the preceding or subsequent examples, wherein the net backrest is attached to the backplate at the first attachment location via a first zipper, and the net backrest is attached to the backplate at the second attachment location via a second zipper.

13. The passenger seat assembly of any of the preceding or subsequent examples, further comprising one or more armrest support structures, and wherein the backrest frame is attached to the lower frame via the armrest support structures.

14. The passenger seat of any of the preceding or subsequent examples, further comprising a lumbar support system, a first part of the lumbar support system disposed in the net backrest adjacent to the forward side of the frame, a second part of the lumbar support system disposed in an armrest support structure attached to the lower frame and the backrest frame.

15. The passenger seat assembly of any of the preceding or subsequent examples, wherein the first part comprises a set of cable sets woven into the net backrest, and the second part comprises a set of tension mechanisms connected to the set of cable sets, each tension mechanism configured to independently adjust tension in each respective cable set.

16. The passenger seat assembly of any of the preceding or subsequent examples, wherein the lumbar support system further comprises a set of connecting cables extending around a horizontal support member of the lower frame, the set of tension mechanisms connected to the set of cable sets via the set of connecting cables, and wherein pivoting the backrest frame from an upright position to a reclined position reduces tension in the set of cable sets disposed in the net backrest.

17. The passenger seat assembly of any of the preceding or subsequent examples, wherein the forward surface of the backplate comprises an interior surface and one or more lip surfaces defining a hollow interior, and wherein the net backrest, when attached at the first attachment location and the second attachment location, holds the interior surface in physical contact with the aft side of the backrest frame, with the one or more lip surfaces extending around a perimeter of the backrest frame.

18. A method of assembling a passenger seat, the method comprising:
providing a backrest frame comprising an aft side and a forward side;
bringing a hollow interior surface of a backplate into contact with a portion of the aft side of the backrest frame;
attaching a first end of a net material to an exterior surface of the backplate at a first attachment location; and
attaching a second end of the net material to the exterior surface of the backplate at a second attachment location, wherein, after attaching the first end and the second end to the backplate, the net material contacts the forward side of the backrest frame and holds the hollow interior surface of the backplate in contact with the portion of the aft side of the backrest frame.

19. The method of any of the preceding or subsequent examples, wherein the first end comprises a first side of a zipper, and the first attachment location comprises a second side of the zipper, and wherein attaching the first end of the net material to the exterior surface of the backplate at the first attachment location comprises connecting the first side of the zipper and the second side of the zipper.

20. The method of any of the preceding or subsequent examples, further comprising, subsequent to attaching the first end of the net material, stretching the net material around a first portion of the exterior surface of the backplate, the front side of the backrest frame, and a second portion of the exterior surface of the backplate.

Spatially relative terms, such as "below", "above", "lower", "upper" and the like may be used above to describe an element and/or feature's relationship to another element (s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

That which is claimed is:

1. A seat frame assembly, comprising:
a frame having a forward side and an aft side;
a backplate disposed adjacent to the aft side of the frame, the backplate comprising:
an interior surface that defines a hollow interior of the backplate, the hollow interior surrounding at least a portion the frame; and
an exterior surface comprising a first attachment location and a second attachment location; and
a net material attached to the backplate at the first attachment location and attached to the backplate at the second attachment location, wherein the net material extends from the first attachment location around a portion of the frame to the second attachment location.

2. The seat frame assembly of claim 1, wherein the frame is a U-shaped structure comprising:
a first leg;
a second leg; and
a top extending between the first leg and the second leg.

3. The seat frame assembly of claim 2, wherein the hollow interior of the backplate comprises one or more lips extending around a perimeter of the backplate, the one or more lips:
dimensioned to receive the first leg, the second leg, and the top; and
configured to surround a portion of the first leg, a portion of the second leg, and a portion of the top.

4. The seat frame assembly of claim 1, wherein the net material comprises:
a first end comprising a first structure of a first attachment system; and
a second end comprising a first structure of a second attachment system.

5. The seat frame assembly of claim 4, wherein the first attachment location comprises a second structure of the first attachment system, and the second attachment location comprises a second structure of the second attachment system, each of the first and second attachment systems configured to join respective first structures with respective second structures to tension the net material between the first attachment location and the second attachment location.

6. The seat frame assembly of claim 5, wherein the first attachment system and the second attachment system are zippers.

7. The seat frame assembly of claim 1, further comprising an adjustable lumbar support system, wherein at least a portion of the adjustable lumbar support system is woven into the net material.

8. The seat frame assembly of claim 7, wherein the adjustable lumbar support system comprises a set of cable sets extending between a first leg of the frame and a second leg of the frame, each cable set comprising a plurality of cables.

9. The seat frame assembly of claim 7, wherein, for each cable set, a first end of the cable set is attached to a first leg of the frame and a second end of the cable set is attached to a tension mechanism.

10. A passenger seat assembly, comprising:
a lower frame configured to at least support a seat bottom of a passenger seat; and
a backrest frame attached to the lower frame and configured to at least support a backrest assembly of the passenger seat, the backrest assembly comprising:
a backplate disposed adjacent to an aft side of the backrest frame, the backplate comprising a forward surface and an aft surface; and
a net backrest attached to the backplate at a first attachment location on the aft surface, extending around a forward side of the backrest frame, and attached to the backplate at a second attachment location on the aft surface.

11. The passenger seat assembly of claim 10, wherein the net backrest comprises a flexible net material that is configured to flexibly extend around the forward side of the backrest frame to retain the backrest frame between the backplate and the flexible net material.

12. The passenger seat assembly of claim 10, wherein the net backrest is attached to the backplate at the first attachment location via a first zipper, and the net backrest is attached to the backplate at the second attachment location via a second zipper.

13. The passenger seat assembly of claim 10, further comprising one or more armrest support structures, and wherein the backrest frame is attached to the lower frame via the armrest support structures.

14. The passenger seat of claim 10, further comprising a lumbar support system, a first part of the lumbar support system disposed in the net backrest adjacent to the forward side of the backrest frame, a second part of the lumbar support system disposed in an armrest support structure attached to the lower frame and the backrest frame.

15. The passenger seat assembly of claim 14, wherein the first part comprises a set of cable sets woven into the net backrest, and the second part comprises a set of tension mechanisms connected to the set of cable sets, each tension mechanism configured to independently adjust tension in each respective cable set.

16. The passenger seat assembly of claim 15, wherein the lumbar support system further comprises a set of connecting cables extending around a horizontal support member of the lower frame, the set of tension mechanisms connected to the set of cable sets via the set of connecting cables, and wherein pivoting the backrest frame from an upright position to a reclined position reduces tension in the set of cable sets disposed in the net backrest.

17. The passenger seat assembly of claim 10, wherein the forward surface of the backplate comprises an interior surface and one or more lip surfaces defining a hollow interior, and wherein the net backrest, when attached at the first attachment location and the second attachment location, holds the interior surface in physical contact with the aft side of the backrest frame, with the one or more lip surfaces extending around a perimeter of the backrest frame.

18. A method of assembling a passenger seat, the method comprising:

providing a backrest frame comprising an aft side and a forward side;

bringing a hollow interior surface of a backplate into contact with a portion of the aft side of the backrest frame;

attaching a first end of a net material to an exterior surface of the backplate at a first attachment location; and attaching a second end of the net material to the exterior surface of the backplate at a second attachment location, wherein, after attaching the first end and the second end to the backplate, wherein the net material extends from the first attachment location around the forward side of the backrest frame to the second attachment location and thereby holds the hollow interior surface of the backplate in contact with the portion of the aft side of the backrest frame.

19. The method of claim 18, wherein the first end comprises a first side of a zipper, and the first attachment location comprises a second side of the zipper, and wherein attaching the first end of the net material to the exterior surface of the backplate at the first attachment location comprises connecting the first side of the zipper and the second side of the zipper.

20. The method of claim 18, further comprising, subsequent to attaching the first end of the net material, stretching the net material around a first portion of the exterior surface of the backplate, the forward side of the backrest frame, and a second portion of the exterior surface of the backplate.

* * * * *